Dec. 15, 1925.

O. A. COLBY 1,565,417

ARC WELDING PENCIL HOLDER

Filed Oct. 27, 1920

WITNESSES:

INVENTOR
Ora A. Colby
BY
Wesley G. Carr
ATTORNEY

Patented Dec. 15, 1925.

1,565,417

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

ARC-WELDING PENCIL HOLDER.

Application filed October 27, 1920. Serial No. 419,804.

*To all whom it may concern:*

Be it known that I, ORA A. COLBY, a citizen of the United States, and a resident of Irwin, in the county of Allegheny and State of Pennsylvania, have invented a new and useful Improvement in Arc-Welding Pencil Holders, of which the following is a specification.

This invention relates to electrode holders more especially to a holder adapted for use in arc welding to hold a metal welding pencil or electrode in position.

Holders of this type are manipulated by hand and, therefore, should be light in weight in order that prolonged working with such an apparatus may not unduly tire the operator. Such electrode holders should be sturdy in order that they may withstand rough handling, and should be simple in construction in order to render them inexpensive.

Electrode holders for arc welding of various designs have been proposed, heretofore, but practically all of them were subject to disadvantages in that the structures were often complicated, the holders heavy and cumbersome, and it required considerable skill to manipulate the same properly.

In order to securely hold the welding electrode or pencil on the holder, various devices, more or less complicated, were used. Such devices generally included a cumbersome clamping member with various mechanism for operating the same.

That portion of the holder which is close to the work being welded is subject to considerable amount of heat especially when the electrode or pencil has been almost entirely consumed. The tips of electrode holders have, therefore, become distorted or burnt by the intense heat so that in a short time the entire holder had to be discarded.

My invention obviates the disadvantages of the prior electrode holders, it being among the objects thereof to devise an electrode holder for use in metallic arc welding which is light in weight, easy to handle, simple in construction, and in which various parts which become worn or accidentally damaged may be readily replaced.

In practicing my invention, I provide a handle of non-conducting material, and secure therein a conducting member which serves to transmit current from a cable to the electrode, which is held in a suitable device at the outer end of the conducting member. I provide means for holding an electrode consisting of a spring which is capable of gripping or clamping the electrode against a solid member, which may be the end of the conducting member, but preferably, is a detachable tip which may be renewed on becoming burnt or distorted by use.

In the accompanying drawings forming a part hereof and which illustrate several embodiments of my invention, Fig. 1 is an elevational view of one form of my electrode holder;

Figure 1:
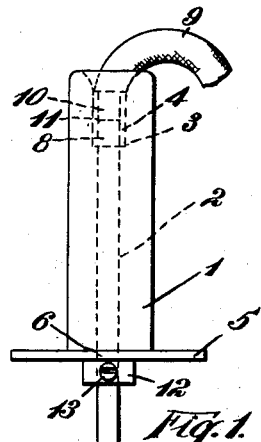
Figure 2:
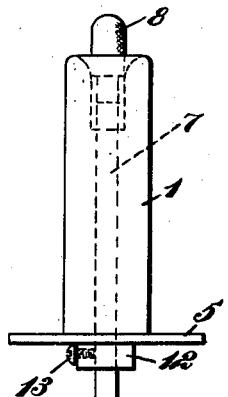
Fig. 2 is a similar view at right angles to that of Fig. 1.

A handle 1 of any suitable non-conducting material of such form as to be easily held by the hand, is formed with a central opening 2, the rear end of which has a shoulder 3 forming an enlarged opening 4 in the handle. A guard 5, also of any suitable non-conducting material, having an opening 6 in line with opening 2, is formed on the handle 1 either integrally therewith or being secured thereto by any suitable means.

A conducting member 7, usually cylindrical, extends through opening 2 in handle 1, the rear end 8 thereof terminating in enlarged opening 4. A cable 9 has its end 10 inserted in opening 4, the end thereof abutting the end of member 7 and being welded thereto at point 11. Preferably, the metal weld fills a substantial portion of enlarged opening 4. A collar 12, slidably mounted on conducting member 7, carries a set screw 13 adapted to clamp the collar to the conducting member and against guard 5 of handle 1 in order to hold the conducting member and the handle in fixed relation to each other.

The free end 14 of conducting member 7 extends into a correspondingly shaped opening in tip 15, the two parts being secured together by a tapered pin 16. The outer end of tip 15, which is preferably square in cross section, is beveled as shown at 17 and a groove 18 is provided therein. A spring member 19 is secured to tip 15 by set screw 20, and an opening 21 corresponding in outline to the cross section of tip 15 is provided therein, the tip 15 being extended through such opening. The free end 22 of spring 19 is bent so that its face 23 lies parallel to the face 17 of tip 15. A groove 24 thereon is in alinement with groove 18, co-operating with the same to hold an electrode or pencil 25.

Figure 3:
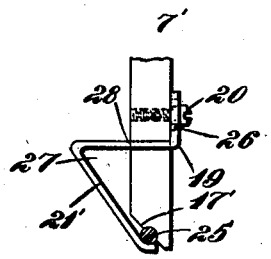
Fig. 3 is a detailed view of the holder portion of a slightly modified form of electrode.
Figure 4:
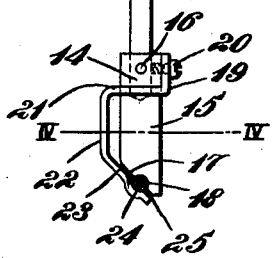
Fig. 4 is a cross-sectional view on line IV—IV of Fig. 1.

In the embodiment shown in Fig. 3, the details of construction have been somewhat modified. Instead of adding a renewable tip 15 to the end of member 7, the corresponding member 7' has merely been extended, having formed on its end the beveled portion 17' co-operating with spring member 21' in a manner similar to that described above. Instead of providing a circular opening in spring 19 for set screw 20, an elongated slot 26 is formed thereon in order to allow longitudinal adjustment of the spring to accommodate various sizes of electrodes. The spring member itself is bent to a slightly different form so as to form a wedge-shaped opening 27 to more readily allow a new electrode to be placed in position on the device.

The construction of my new electrode holder is very simple and, in the embodiment shown in Fig. 1, it is only necessary, when it is desired to take the device completely apart, to remove screws 13 and 20 and tapered pin 16, whereby the holder may be separated into its component parts. It will be noted that if any part should become worn or damaged or broken, it may be easily replaced by a new part by simply removing a set screw or a pin. Such a construction has numerous advantages, especially in providing renewable tips and spring clamping members since these parts quite frequently require replacements, and in prior structures it was necessary to replace the entire holder.

By providing a spring of the form shown, no strain whatever is placed upon the screw which holds the spring in position, the clamping portion thereof being fulcrumed at point 28. By providing a wedge-shaped opening 27, it becomes a very simple matter to replace an electrode, the major portion of which has been consumed. A new electrode is slipped into the larger portion of opening 27 and then drawn forward. This releases burnt-out electrode 25 which drops out, allowing the new electrode to slip into its place.

It is to be understood that my invention, although described in certain embodiments, is not limited to the details shown but various changes may be made in the construction of my new electrode holder without departing from the principles thereof. For instance, although I generally prefer to weld the cable to the conducting member, it is obvious that other arrangements, such as a metal sleeve soldered or welded to the two members, may be used for the purpose. I may replace collar 12 by any other arrangement for holding conducting member 7 in fixed relation to the handle, and various other changes in construction will be obvious to those skilled in the art.

I claim as my invention:

1. An electrode holder comprising a handle, a conducting member extending therefrom, and a spring device for holding an electrode secured thereto, said device having an opening through which said member extends.

2. An electrode holder comprising a handle, a conducting member extending therefrom, and a spring device for holding an electrode secured thereto, said device having an opening through which said member extends, the free end of said device and of said member constituting electrode-holding means.

3. An electrode holder comprising a handle, a conducting member extending therefrom, a tip secured to said conducting member and a spring device for holding an electrode secured thereto, said device having an opening through which said tip extends, the free end of said device and of said tip constituting the electrode-holding means.

4. An electrode holder comprising a handle, a conducting member extending therefrom, a tip secured to said conducting member, and a spring device for holding an electrode secured thereto, said device having an opening through which said tip extends, the free end of said device and of said tip constituting the electrode-holding means, both said spring and tip being removably secured to said member.

5. In an electrode holder, a conducting member, a spring having one end secured to said member, an opening in said spring through which said member passes, the free end of said spring being so bent that its face lies approximately parallel to the end face of said conducting member.

6. In an electrode holder, a conducting member, a spring having one end secured to said member, an opening in said spring through which said member passes, the free end of said spring being so bent that its face lies approximately parallel to the end face of said conducting member, and means on the opposed faces for holding an electrode.

7. In an electrode holder, a conducting member, a spring having one end adjustably secured to said member, an opening in said spring through which said member passes, the free end of said spring being so bent that its face lies approximately parallel to the end face of said conducting member.

8. In an electrode holder, a conducting member, the end thereof being beveled, a spring having one end adjustably secured to said member, an opening in said spring through which said member passes, the free end of said spring being so bent that its face lies approximately parallel to the beveled end face of said conducting member, and alined grooves on the opposed faces for holding an electrode.

In testimony whereof, I have hereunto subscribed my name this 13th day of October, 1920.

ORA A. COLBY.